United States Patent

[11] 3,630,069

[72] Inventor Frank F. White
 Shaker Heights, Ohio
[21] Appl. No. 27,735
[22] Filed Apr. 13, 1970
[45] Patented Dec. 28, 1971
[73] Assignee Automation Development Corporation
 Mentor, Ohio

[54] FEEDER FOR SMALL DIAMETER BARS
 22 Claims, 12 Drawing Figs.
[52] U.S. Cl. .................................................. 72/420
[51] Int. Cl. ................................................ B23g 11/00
[50] Field of Search .......................................... 72/420,
 419; 214/1.2, 1.1

[56] References Cited
 UNITED STATES PATENTS
 2,573,669 10/1951 Macbeth ...................... 72/420 X
 3,480,159 11/1969 White et al. .................. 214/1.2

Primary Examiner—Milton S. Mehr
Attorney—McCoy, Greene & Howell

ABSTRACT: A bar feeder especially designed to handle bars and tubes of widely varying diameters, including those of very small diameter, and having an escapement mechanism of simple inexpensive construction, an improved box beam frame construction and a novel feeding system wherein gripping jaws grip and locate the end of each bar near the beginning and end of each cycle to assist the feed fingers in gripping the bar and in releasing the remnant and to assure proper positioning of the bar relative to the conveyor. A novel retractable stop is provided to stop the pusher so that the remnant is gripped while the feed fingers are still a few inches from their retracted positions.

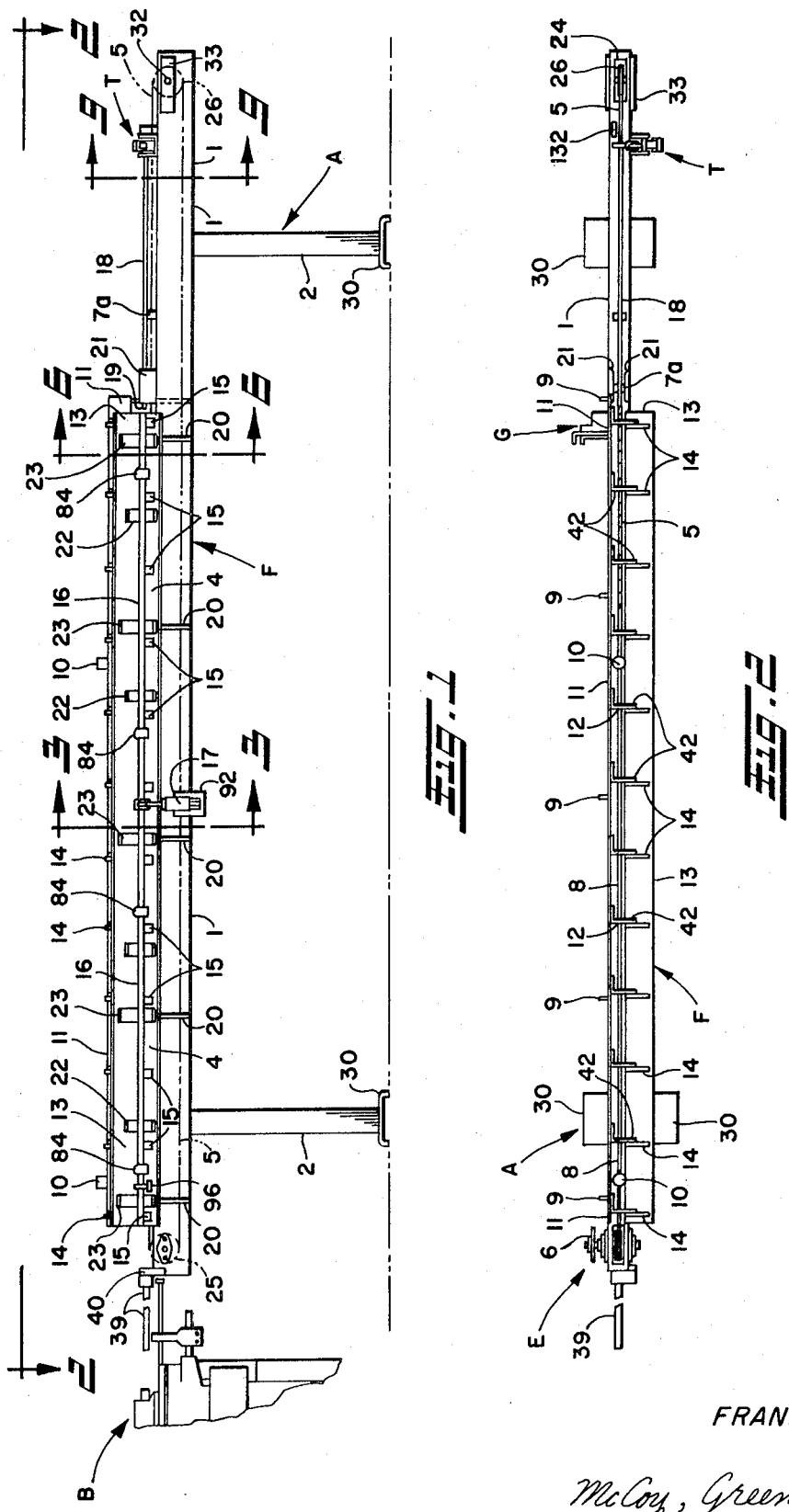

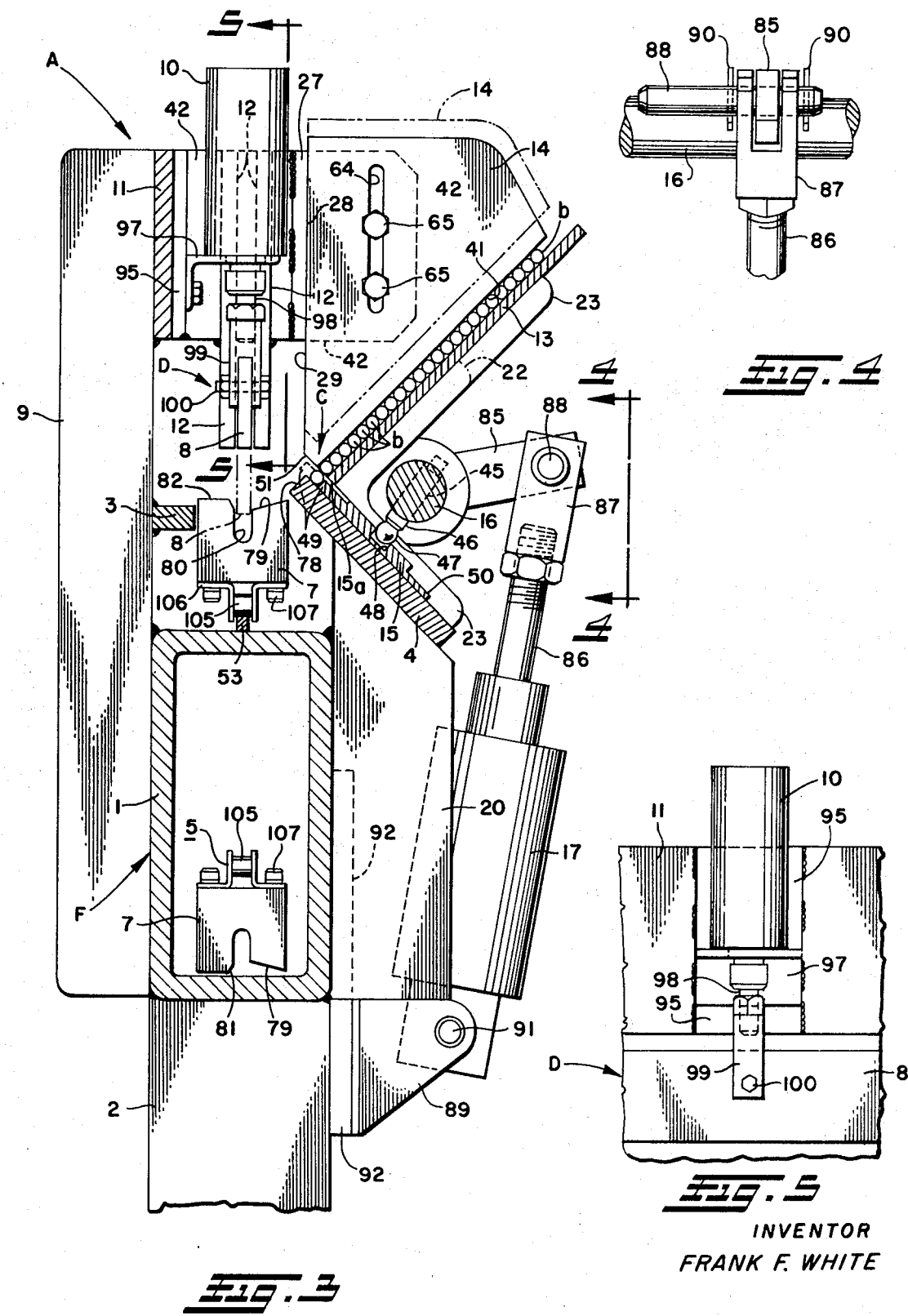

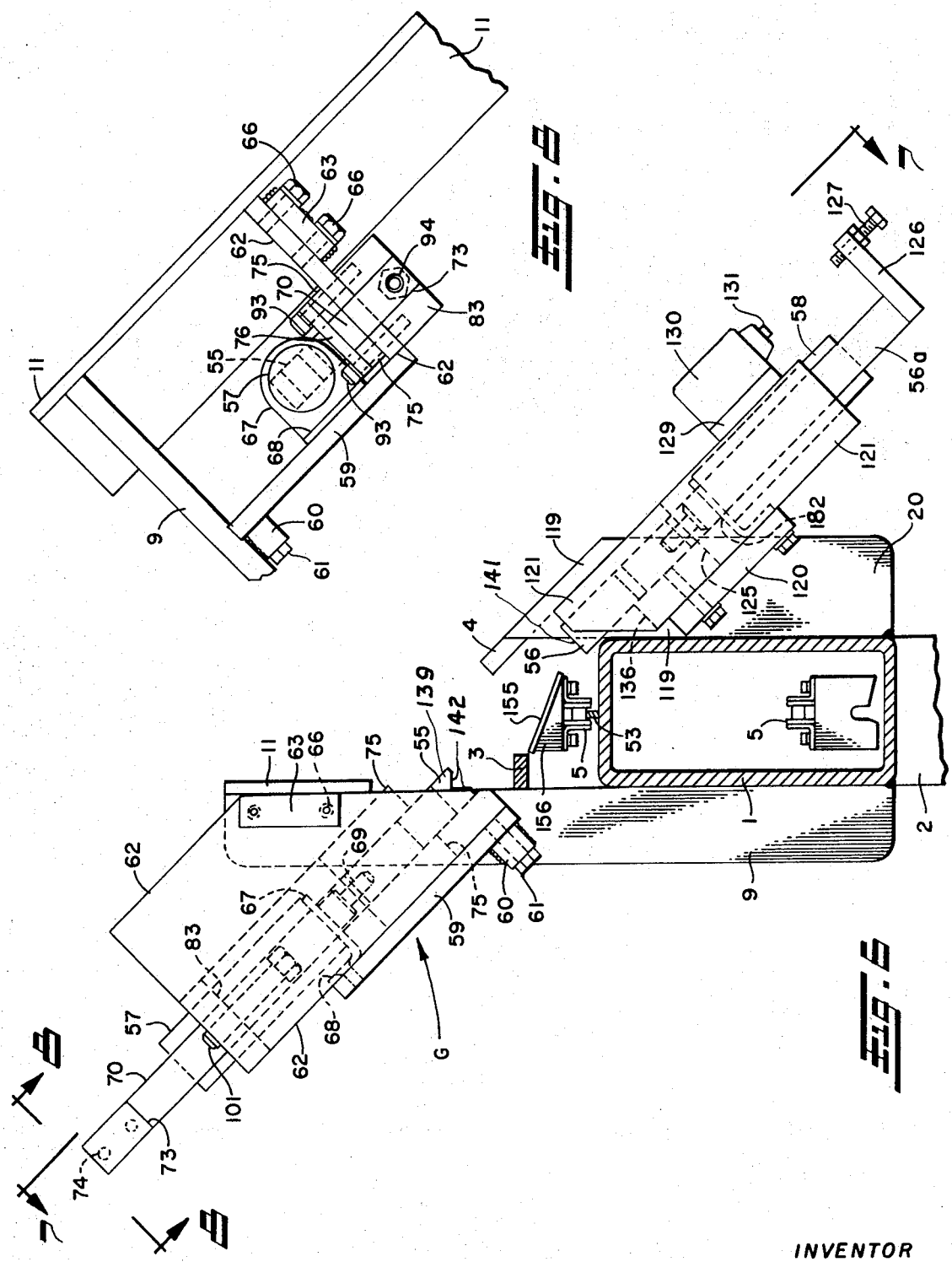

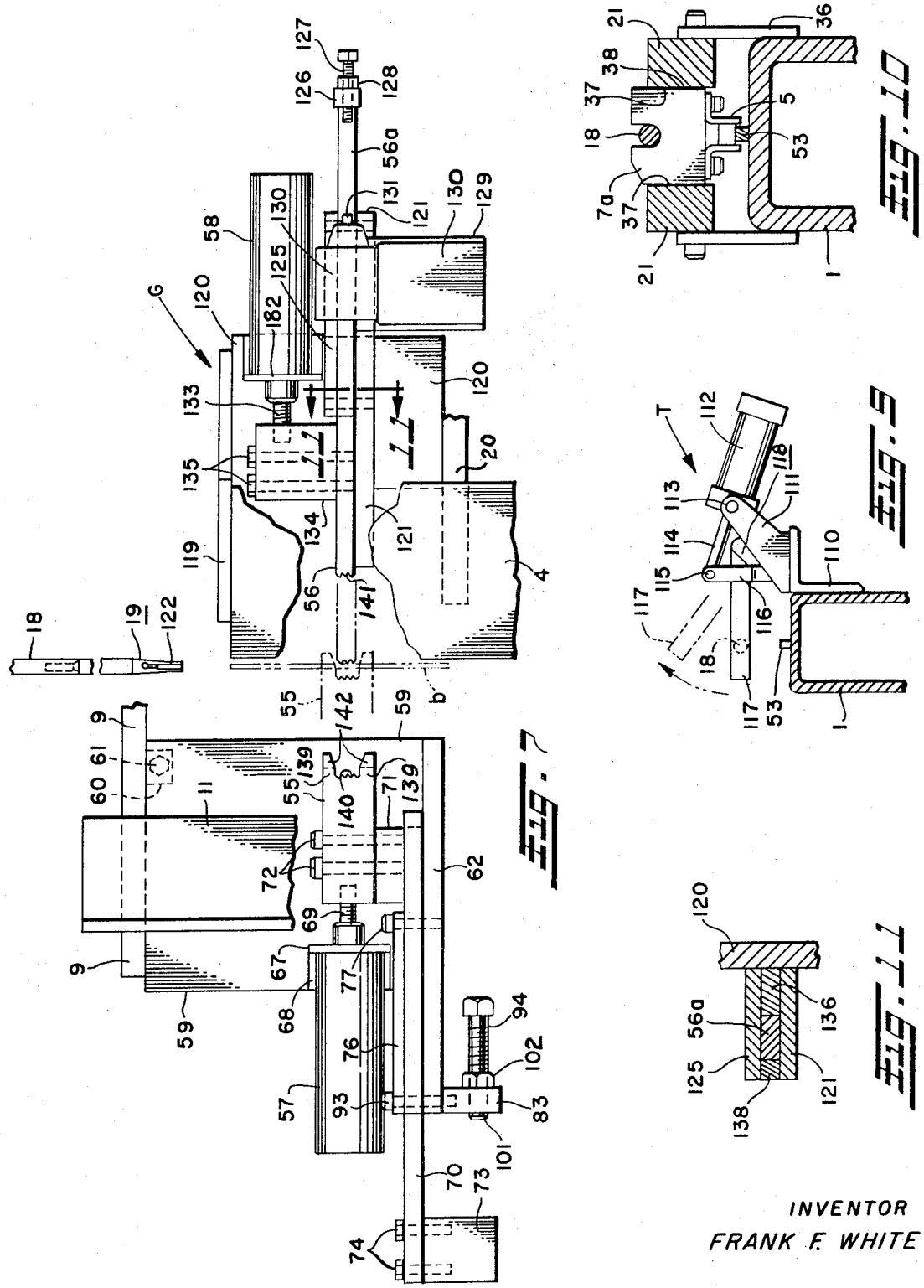

3,630,069

FEEDER FOR SMALL DIAMETER BARS

DESCRIPTION OF THE INVENTION

The present invention relates to bar feeders for automatically feeding bars one at a time to a screw machine, lathe or the like and more particularly to a versatile inexpensive bar feeder which can be adjusted to handle bars of widely varying diameter or cross section and which functions effectively with bars of very small diameter.

Heretofore, automatic bar feeders have been unreliable when feeding bars which are bent or which bend under their own weight, particularly long bars of very small diameter. It has also been a problem to provide a reliable feed for such bars because of the difficulty involved in trying to grip the ends of such bars when the bars are not straight.

The present invention provides the solution to these problems and makes it possible to provide a simple bar feeder capable of handling bars of extremely small diameter as well as bars of substantially greater diameter. The feeder has a pair of gripping jaws which automatically grip and straighten the bar during the first part of the cycle and hold it so that there is no difficulty in forcing the feed fingers over the end of the bar and in properly positioning the bar longitudinally relative to the pusher. After the machining or cutting operations have been performed and while the remnant is being retracted, the rearward movement is interrupted by a retractable top, the grippers are moved into gripping engagement with the remnant, and the feed fingers are pulled off the remnant by rapid retraction of the pusher.

The bar feeder has a novel sequence of operations which is controlled automatically. During each cycle the escapement mechanism feeds one bar only to the conveyor, the gripping jaws are moved against the bar to hold it firmly, the pusher rod is advanced at high speed to force the feed fingers over the end of the bar, and the gripping jaws are released to permit the conventional forward feed to the lathe, screw machine or the like. After the machining or cutting operations on the bar are completed, the remnant is retracted at high speed, and such retraction is slowed down just before the pusher engages the retractable stop. The gripping jaws then grip the remnant, the pusher is retracted at high speed to pull the feed fingers off of the remnant, and the remnant is removed or rejected.

The gripping jaws in combination with the retractable stop enable to feed fingers to grip and release the bar in a simple, reliable manner without the necessity for the usual complicated and expensive equipment and also ensure proper longitudinal positioning of the bar relative to the conveyor.

An object of the invention is to provide a simple, reliable, inexpensive bar feeder which can be adjusted to handle bars of widely varying cross sections and which functions effectively with bars of very small diameter.

A further object of the invention is to provide a bar feeder with simple means for gripping the bar, for withdrawing the bar remnant, and for releasing and ejecting the remnant.

A still further object of the invention is to provide an improved escapement mechanism which can easily be manufactured, assembled and disassembled and which can easily be adjusted to handle bars of different diameters.

Another object of the invention is to provide a simple reliable frame construction for a long bar feeder which maintains alignment of parts within close tolerances and which can be manufactured at low cost.

Another object of the invention is to provide an automatic bar feeder for small diameter bars which does not require closely spaced carriers on the conveyor.

These and other objects, uses and advantages of the present invention will become apparent to those skilled in the art from the following description and claims and from the drawings, in which:

FIG. 1 is a side elevational view on a reduced scale with parts omitted and parts broken away showing a bar and tube feeder constructed according to the present invention;

FIG. 2 is a top plan view of the feeder looking in the direction of the arrows 2—2 of FIG. 1;

FIG. 3 is a transverse vertical sectional view taken on the line 3—3 of FIG. 1 and on a larger scale;

FIG. 4 is a fragmentary side elevational view looking in the direction of the arrows 4—4 of FIG. 3;

FIG. 5 is a fragmentary elevational view looking in the direction of the arrows 5—5 in FIG. 3;

FIG. 6 is a transverse vertical sectional view taken on the line 6—6 of FIG. 1 and on a larger scale with parts omitted;

FIG. 7 is a fragmentary view looking in the direction of the arrows 7—7 of FIG. 6 with parts omitted and broken away, the clamping jaws being shown in dot-dash lines in their clamping position;

FIG. 8 is a fragmentary view looking in the direction of the arrows 8—8 of FIG. 6;

FIG. 9 is a fragmentary transverse vertical sectional view taken on the line 9—9 of FIG. 1 and on a larger scale with parts omitted, the stop being shown in solid lines in its advanced operative position and in broken lines in its retracted position;

FIG. 10 is a fragmentary transverse vertical sectional view;

FIG. 11 is a transverse vertical sectional view taken on the line 11—11 of FIG. 7 with parts omitted.

Figure 12:
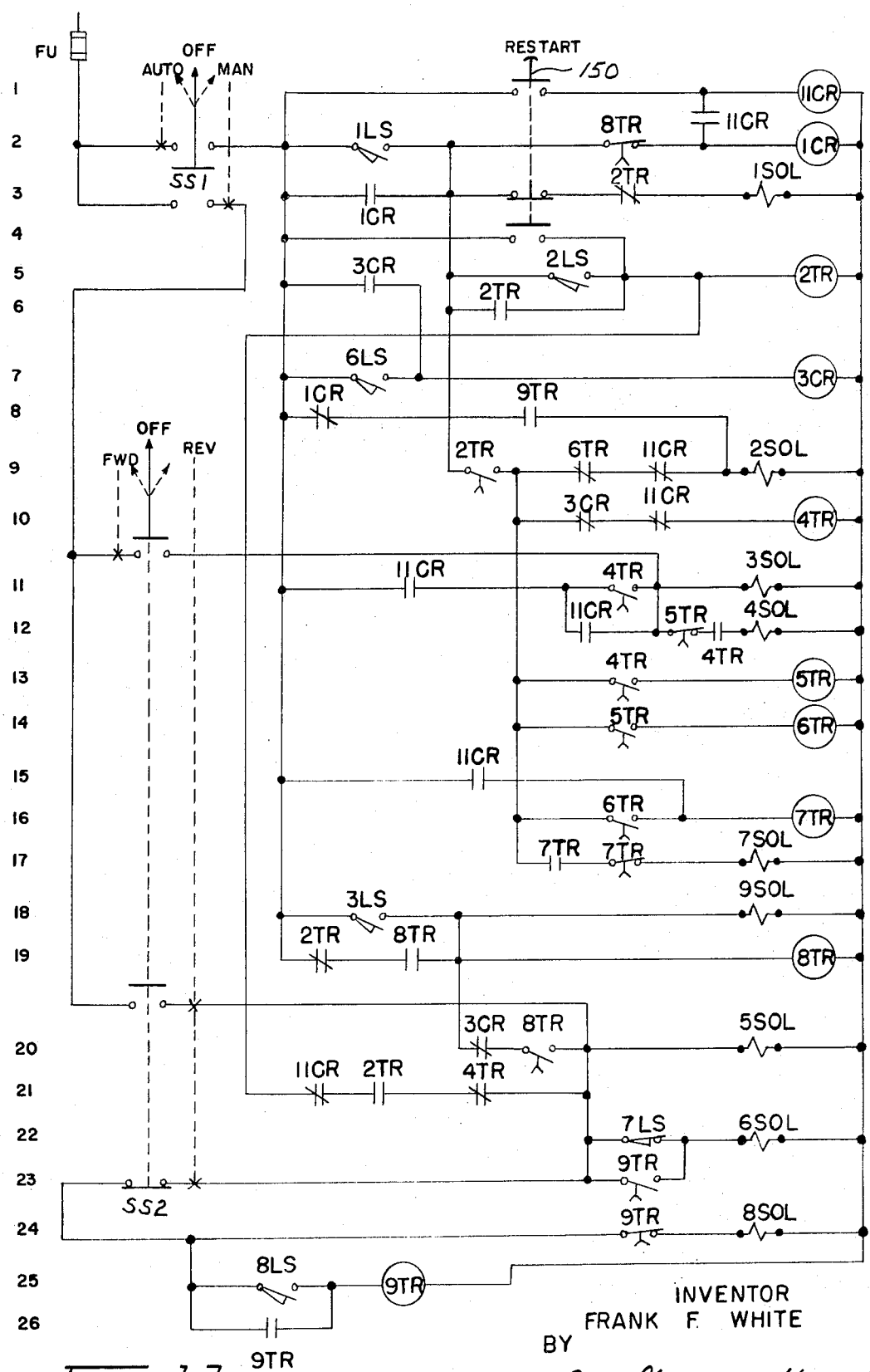
FIG. 12 is an electrical diagram showing one form of automatic control system which may be employed.

Referring more particularly to the drawings, which are drawn substantially to scale and in which like parts are identified by the same numerals throughout the several views, FIGS. 1 to 5 show a bar and tube feeder A for automatically feeding small diameter bars or tubes to a conventional automatic screw machine or lathe B. The feeder has an escapement assembly C, a capping assembly D, a drive assembly E, and a frame F which correspond generally to the assemblies C, D, E and F of the feeder A disclosed in applicant's copending application Ser. No. 879,434, now U.S. Pat. No. 3,581,879 filed Nov. 24, 1969, which is a continuation of application Ser. No. 600,350, now U.S. Pat. No. 3,480,159 filed Nov. 22, 1966.

The elements 1, 2, 5, 6, 7, 7a, 8, 10, 12, 16 through 19, 24, 25, 26, 32, 33, 53, 64, 65, 79, 80, 84 through 89, 96 through 99, 105, 106, 107, 122, 155 and 156 of the bar feeder A shown herein are similar or improved forms of corresponding elements disclosed in said copending application and identified by the same numerals. Except as will appear from the following description, each of these elements functions generally the same in the combination as the corresponding element disclosed in said copending application.

The bar feeder A of this invention has a long narrow frame F with a unique construction which permits spacing of the legs 2 a great distance apart without weakening the frame. This is made possible by use of a box beam 1 having a uniform generally rectangular cross section as shown in FIG. 3. The beam usually has a length of 15 to 25 feet and is supported in a horizontal position by two vertical legs 2. The bottom of each leg is welded to a steel channel 30 with a length of 20 to 30 inches which rests on the floor.

A conveyor in the form of a roller chain 5 is mounted on the frame and driven by a conventional drive assembly E including a conventional reversible vane-type air motor 6. A series of stock carriers 7 are detachably connected to the roller chain at spaced locations along the length of the chain, and a capping bar 8 with a length of 10 feet is mounted on the frame above the carriers for vertical movement into and out of engagement with the bar on the carriers to prevent whipping of the bar during high-speed rotation of the bar.

A series of vertical steel supporting plates 9 of generally rectangular shape are welded to one side of the box beam 1 at spaced locations along its length as shown in FIG. 2, and a series of vertical steel plates 20 of trapezoidal shape are welded to the opposite side of the beam directly opposite the plates 9. A straight narrow horizontal side bar 3 of rectangular cross section with a length of 12 feet or so is welded to each of the five plates 9 in a position parallel to the sides of the beam 1 and to the upper flight of the chain 5 to provide a guide adjacent to and engageable with the carriers 7 to maintain the carriers in the desired upright positions as shown in FIG. 3. A flat rectangular steel plate 4 with a length of 12 feet or so is welded to the inclined upper edge portions of the five vertical plates 20 in an inclined position with the side edges of the plate 4 parallel to the bar 3. A long flat steel reinforcing plate 11 is rigidly mounted directly above the bar 3 and extends the full length of said bar with its outer vertical face located in the same plane as the vertical side face of the box beam 1. The plate 11 is welded to the five plates 9 at the top portions of said plates. The transverse vertical plates 9 and 20 and the longitudinal members 3, 4 and 11 provide a narrow rigid frame structure which is quite strong and can be manufactured at relatively low cost.

The roller chain 5 of the endless conveyor is centrally located between the longitudinal member 3 and 4, and the upper flight of the chain is held in a horizontal position by a narrow straight guide bar 53 which engages the rollers 105 of the chain and extends between the sprockets 25 and 26. The shafts of said sprockets are journaled for rotation at the opposite ends of the box beam 1, and slots 24 are provided in the beam to receive the sprockets and to permit the desired movement of the chain and its carriers 7 and 7a. The shaft 32 of sprocket 26 is preferably mounted on an adjustable supporting block 33 to permit adjustment of the tension in the chain.

The carriers 7 and 7a and the ejector trays 155 are detachably connected by mounting screws 107 to link flanges 106 of L-shaped cross section which are spaced along the length of the chain at suitable intervals, usually 1 foot or more apart. Said carriers may be formed of steel and are preferably formed of an elastomeric polyurethane.

The shape of the carriers 7 may vary considerably depending on the size and cross section of the bars b being fed to the machine B. As herein show, each carrier 7 has a uniform thickness and is provided with a flat sloped upper surface 79, a rounded central notch 80 with a width substantially the same as that of the capping bar 8, a flat shoulder 81 at one side of the notch perpendicular to the plane of the surface 79, and a flat upper surface 82 extending from the shoulder 81 to the outer edge of the carrier adjacent the guide rail 3. The carriers 7 are in alignment so that a bar b fed from the plate 4 rolls over the flat upper surface 78 of said plate onto the sloped surfaces 79 and into the notches 80 before the capping bar 8 is lowered into the notches (as shown in broken lines in FIG. 3).

Means are provided on the conveyor for gripping the end of each bar b after it is placed on the carries 7 and for feeding the bar axially in unison with the conveyor chain including a long cylindrical pusher rod 18 mounted on the chain and having its front portions supported on one or more carriers 7a. A conventional feed finger assembly 19 is rotatably mounted on the front portion of the pusher rod 18 and has a plurality of conventional resilient metal feed fingers 122 for gripping the end of the bar b. Such feed finger assembly may be similar to that shown in U.S. Pat. No. 3,493,125. A stationary stop block 132 is mounted on the beam 1 to limit the rearward movement of the pusher rod, and a toggle stop assembly T is preferably mounted a short distance from the stop block as described in more detail hereinafter.

Guide means are provided for locating the front of the pusher rod 18 accurately so that the small bar-receiving opening in the finger assembly 19 will be in the proper position to receive the bar. As herein shown, such means includes a pair of parallel longitudinal guide bars 21 rigidly supported on the box beam 1 by two or more vertical plates 36 and having flat vertical inner faces 37 which engage the flat vertical side faces 38 of the carriers 7a as shown in FIG. 10.

When it is desired to provide side ejection of the remnants, some of the carriers 7 nearest the carriers 7a may be replaced with sloping ejector trays 155 (FIG. 6) which facilitates rolling or sliding of the remnant out the side of the machine as explained in said copending application Ser. No. 879,434. Each tray 155 has an inclined upper surface and has a support block 156 detachably connected to the link flanges 106.

When the pusher rod 18 is fully advanced, it is out of contact with the carriers 7a and projects over the machine B. If desired, a horizontal guide tube 39 may be provided to receive the pusher rod 18 and maintain it in the proper position. Said tube is rigidly mounted on the front of the box beam 1 by suitable supporting members 40 and has a smooth internal cylindrical surface with a diameter substantially equal to the external diameter of the rod 18.

Means are provided for supporting a stack of bars b for feeding one at a time to the conveyor. Such means includes a long inclined flat rectangular plate 13 of uniform thickness rigidly supported on the plate 4 and having a length equal to that of the plate 4 and only slightly less than that of the plate 11. A series of regularly space guide plates 14 of generally triangular shape are adjustably supported from the plate 11 for movement toward and away from the latter plate when the diameter of the bars b is changed.

As herein shown, the plate 13 is perpendicular to the plate 4 and parallel to the bar 53 and the upper flight of the conveyor chain and is rigidly supported by a series of small regularly spaced angles 22 and a series of larger angles 23 rigidly mounted on the plates 4.

A series of regularly spaced supporting angles 42 are rigidly mounted in vertical positions on the plate 11 and extend over the plate 13 as shown in FIG. 3. A pair of locking screws 65 are provided on the end portion of each angle 42 to hold its associated guide plate 14 in the desired position. A vertical slot 64 is provided in each plate 14 to receive the screws 65 and permit the desired vertical adjustments.

A vertical bar 27 of square cross section is preferably welded to each angle 42 to provide a flat face 28 for slidably engaging the flat vertical face 29 of the associated plate 14 to maintain the straight edge 41 of said plate parallel to the plate 13. As herein shown, 12 plates 14 are provided to maintain the bars b straight when they have very small diameters, but the spacing of the plates 14 can be varied.

A simple unique escapement assembly C is provided to escape one bar b at a time from the stack onto the carriers 7. The assembly includes a series of regularly spaced flat escapement fingers 15 of uniform width which slide on the flat upper surface of the plate 4 and move under the plate 13 through a slot or opening 15a between the plate 13 and the plate 4. The size of such opening may be fixed or may be variable if the plate is adjustably mounted on the brackets 22 and 23.

The fingers 15 are reciprocated in response to turning of a long shaft 16 which is rotatably mounted on a series of bearings 84 carried by the plate 4. A lever arm 85 is rigidly connected to the shaft 16 and is actuated by the piston rod 86 of a pneumatic cylinder 17, said rod being attached to the lever 85 by a pivotal connection 87 having a horizontal pivot pin 88 parallel to the shaft 16. A pair of cotter pins 90 extend through the pin 88 to limit its axial movement and to permit easy disassembly. The cylinder 17 is pivotally mounted on the box beam 1 by a supporting bracket 89 which receives the pivot pin 91. As herein shown, the bracket 89 is rigidly mounted on a flat vertical plate 92 welded to the box beam.

Each of the escapement fingers 15 has an operating member 45 in the form of a pin having a cylindrical shank 46 and a spherical head portion 47 integral with the shank. As herein shown, each finger 15 has a circular recess 48 of uniform depth with a diameter about the same as that of said head portion 47 so that the latter fits in the recess generally as indicated in FIG. 3. The shaft 16 has a number of parallel cylindrical bores equal to the number of fingers 15 and located to receive the shanks 46, said bores having an internal diameter equal to that of the shanks and firmly holding the operating means 45 in position so that they move in unison with the shaft 16.

The pneumatic cylinder 17 has a limited stroke and causes the rock shaft 16 to swing a short distance between a first retracted position and a second advanced position. In the retracted position shown in FIG. 3, all of the fingers 15 are in alignment and their bar-engaging ends 49 are at or below the plane of the bar-engaging surface of the plate 13. In the uppermost advanced position, all of said ends 49 are in alignment and project beyond the surface 78 of the plate 4 as shown, for example, in broken lines in FIG. 3. The total stroke is thus only a fraction of an inch and greater than the diameter of the bar b being fed to the conveyor. The stroke of the piston rod 86 is, therefore, very small.

As shown in FIG. 3, the rectangular end portion 49 has a uniform thickness less than the diameter of the bar b so that it pushes one bar only under the lower edge 51 of the guide plate 14 when it is advanced, the remaining bars being held against movement by the straight edge 41 of said guide plate. The end portion 49 can also function when its thickness is materially less than the bar diameter, but such thickness should not exceed the bar diameter.

When the bar feeder A is adjusted to handle bars b with a diameter less than the thickness of end portion 49, the fingers 15 must be modified or replaced with fingers having end portions thinner than such bars. A quick and simple way to make this change is to provide each finger 15 with at least one thinner rectangular end portion 50 suitable for bars b of very small diameter (e.g., one-eighth inch or smaller) and to reverse the fingers 15 instead of replacing them with different fingers.

Reversible fingers 15 are shown in the drawings having end portions 49 and 50 of different thickness. It is a simple matter to reverse the fingers as they do not require guide bars or guide slots to function properly. Each finger 15 slides on the flat upper surface of the plate 4, and there is no obstruction to prevent turning of the finger after it is retracted beyond the plate 13. When assembled as shown in the drawings, the sides of the slot 15a prevent turning and an operating pin 45 holds each finger 15 against the plate 4 and maintains it in the proper position at all times.

When it is desired to reverse the fingers 15, all that is necessary is to remove the cotter pin 90 and slide out the pivot pin 88 to free the lever arm 85. Then the arm is moved slightly until the ends of the fingers move out of the slots 15a and clear the plate 13, and each finger 15 is turned 180° while still being held by the pins 45 against the plate 4 so that the end portion 50 of each finger is adjacent the slot 15a instead of portion 49.

Then the arm 85 is moved to cause all of the end portions 50 to enter the slots 15a and to position the pin-receiving openings of said lever and the yoke 87 is alignment. The pin 88 is then reinserted in such openings and the cotter pins 90 are reinserted. The pin 88 is preferably long as shown in FIG. 4 to facilitate handling during assembly and disassembly.

The escapement mechanism of this invention functions exceptionally well with a wide range of different bar diameters and is more desirable than other escapement devices heretofore used because of its simplicity, compactness, low cost of manufacture, ease of assembly and ease of adjustment. The assembly C is capable of handling light bars with extremely small diameters and also relatively heavy bars. For example, a feeder of the type shown in the drawings could handle bars with a diameter of 0.1 inch or less and also bars with a diameter of one-half inch or more. FIG. 3 shows in broken lines the position of the guide plate 14 when it is adjusted to handle the larger bars. If the bars are very large, it may become necessary to replace the polyurethane carriers 7. This can be done with relative ease. It is not necessary to change the carriers 7 when handling extremely small bars because the groove 80 functions well for these bars and other bars having a diameter less than the width of said groove.

The capping assembly D is generally the same as that described in said copending application Ser. No. 879,434 and operates in essentially the same way. It includes a straight horizontal capping bar 8 of rectangular cross section having a length of 10 feet or so and a thickness slightly less than the width of the grooves 80. The bar 8 is held in vertical alignment with the chain 5 and said grooves by pairs of vertical guide bars 12 and moves into the grooves. The bar 8 may be made of steel or other material and preferably has a sufficient thickness to remain straight. If desired it may have a covering of polyurethane or other elastomeric material.

Each guide bar 12 is of square cross section and is welded to one of the angles 42 parallel to the bar 27. A pair of bars 12 is preferably welded to each of the angles 42.

One or more automatically controlled pneumatic cylinders 10 are provided for raising and lowering the capping bar 8 between the uppermost position shown in solid lines in FIG. 3 and the lower position shown in broken lines in that figure. As herein shown, two cylinders 10 are provided on the bar feeder A near the opposite ends of the bar 8. Each cylinder is mounted on an angle bracket 97 which is rigidly connected to a rectangular vertical plate 95 welded to the plate 11 (see FIGURE 5). The vertical piston rod 98 of each cylinder 10 has a yoke 99 pivotally connected to the capping bar 8 by a bolt or pin 100 which extends through said bar.

A clamping assembly G is provided near the rear of the bar feeder forwardly of the guide bars 21 for clamping one bar b and holding it against movement so that the feed fingers 122 may be forced over the end of the bar when the pusher rod 18 is advanced. This assembly includes upper and lower clamping jaws 55 and 56 which are moved into and out of engagement with the bar b by pneumatic cylinders 57 and 58, respectively.

The pneumatic cylinder 57 is carried by a rigid framework including a flat rectangular plate 59 which is mounted in an inclined position parallel to the direction of movement of the clamping jaws and a flat trapezoidal vertical plate 62 which is perpendicular to the plate 59 and parallel to the upright supporting plates 9. A small rectangular block 60 is welded to the outermost plate 9 to provide a rigid support for the plate 59 and has a screw 61 which detachably connects the block to the plate 59. A rectangular connecting plate 63 is welded to the horizontal plate 11 and has a pair of screws 66 which rigidly connect the plate 62 to the plate 63 and the horizontal plate 11.

A mounting bracket 67 is provided for supporting the cylinder 57 and has a flat base flange 68 rigidly mounted on the plate 59. The remaining portion of the bracket is perpendicular to the flange and has a circular opening to receive the cylinder 57 as shown in FIG. 81. The piston rod 69 of the cylinder 57 is detachably connected to the clamping jaw 55 and is adapted to move a few inches from the position shown in solid lines in FIG. 7 to the position shown in broken lines in that figure.

The amount of movement of the upper clamping jaw 55 is limited by a suitable stop means mounted to move in unison with the piston rod 69. As herein shown a flat narrow guide bar 70 of rectangular cross section is mounted to slide on the flat surface of the plate 62 and is rigidly connected to the clamping jaw 55 by a spacer block 71 and a pair of screws 72 which may extend through the spacer into the guide bar 70.

The bar 70 is guided parallel to the direction of movement of the piston rod by a pair of flat guide bars 75 which engage the opposite side faces of the bar 70 (see FIG. 8). A flat cover plate 76 engages the flat outer surfaces of the bars 70 and 75 and is rigidly connected to the plate 62 and the bars 75 by a pair of screws 77 located near the spacer 71 as shown in FIG. 7. A similar pair of screws 93 are located at the opposite end of the cover plate 76 and extend through the bars 75 and the plate 62 into a transverse supporting plate 83. The latter plate is internally threaded to receive an adjustable stop screw 94 which is held in its adjusted position by a nut 102. The end 101 of the stop screw is engageable with a stop 73 which is rigidly connected to the bar 70 by a pair of screws 74.

The lower portion of the clamping assembly G is mounted on the side of the box beam 1 which contains the supporting plates 20 and includes a rhomboidal-shaped vertical plate 119 and a flat rectangular plate 120 extending from plate 119 to the adjacent vertical supporting plate 20 and rigidly connected to said plates. A flat vertical generally trapezoidal mounting plate 121 is rigidly mounted on the plate 120 and is spaced a fraction of an inch from the box beam as shown in FIG. 6. The lower clamping jaw 56 is located at the end of a flat straight bar 56a of uniform rectangular cross section which is mounted to slide on the plate 121 between a pair of flat parallel straight bars 136 and 137 of uniform rectangular cross section (see FIG. 11). The latter bars are bolted to or otherwise rigidly connected to the plate 121 and to a flat rectangular cover plate 125 which engages the jaw bar 56a as it slides on the plate 121.

The lower clamping jaw 56 is reciprocated toward and away from the upper jaw 55 by a pneumatic cylinder 58 having a piston rod 133 connected to a block 134, which is rigidly connected to the jaw bar 56a by screws 135. The cylinder 58 is carried on a mounting bracket 182, similar to the bracket 67, which is rigidly mounted on the plate 120.

The bar 56a moves in a direction parallel to the direction of movement of the upper clamping jaw 55 and perpendicular to the direction of movement of the bar b and the pusher 18. FIGS. 6 and 7 show the retracted position of the jaws 55 and 56 in solid lines and show the advanced positions of such jaws in dot-dash lines (when they engage the bar b). As shown, the jaw 55 is wider than the jaw 56 and has bifurcations 139 spaced apart a distance slightly greater than the width of the jaw 56 to accommodate a toothed surface 140 which fits the toothed bar-engaging surface 141 of the jaw 56 so that the two jaws will fit together if they move into contact during absence of a bar b on the carriers 7. Each of the portions 139 has a V-shaped surface 142 located to receive the bar b and having its center in alignment with the bar so that it will properly engage the bar and will operate properly with bars of different diameter. The surface 142 assists in straightening the bar b when it has a very small diameter and in locating it in alignment with the feed finger assembly 19 so that the end portion of the bar will be properly gripped by the feed fingers 122 when the pusher 18 is advanced.

The stop screw 94 may be adjusted when the bar diameter is changed. A similar stop means may be provided for the clamping jaw 56. As herein shown, a vertical bar 126 is rigidly mounted on the end of the bar 56a and has an internally threaded bore to receive an adjustable stop screw 127 parallel to the bar 56a. A nut 128 similar to the nut 102 may be provided to hold the screw in its adjusted position.

The end of the screw 127 is located to engage the button 131 of a switch 130 and to close the switch if the jaw 56 moves to the surface 140 due to absence of a bar b on the carriers 7. As shown, the switch is mounted on a rectangular plate 129 which is rigidly mounted on the plate 121 and projects therefrom as shown in FIG. 7.

The clamping assembly G serves to hold the bar b in alignment with the feed finger assembly 19 and also serves to hold the bar b against axial movement so that it can be forced into the fingers 122 before it is machined and can be removed from the fingers when the remnant is retracted. The latter function requires stopping movement of the pusher rod 18 so that is can be gripped by jaws 55 and 56 before it is fully retracted. A retractable stop bar 117 is provided for this purpose and is located forwardly of the stop member 132 to stop the pusher rod at a position a few inches from said stop member (e.g., about 3 inches).

Means are provided for moving the bar 117 into and out of the path of movement of the pusher 18 including a double-acting pneumatic cylinder 112. As shown in FIG. 9, such means comprises a toggle-stop assembly T formed by a conventional DE–STA–CO clamping unit, Model 807L, which may be operated either by air or hydraulic fluid. This well-known unit provides a positive mechanical lock in the advanced stop position and an open position independent of line pressure. The unit is mounted on an angle 110 carried by the box beam 1 and has a yoke-type bracket 111 rigidly mounted on said angle. A pair of coaxial pivot pins 113 are provided at the top of the bracket and support the cylinder so that it swings about a horizontal axis. The piston rod 114 is connected to a pivot shaft 115 carried by the upright arm 116 of a conventional toggle mechanism 118 which is connected to the stop bar 117. When the cylinder 112 is operated, the bar 117 moves from the retracted position shown in dot-dash lines in FIG. 9 to the locked stop position shown in solid lines in that figure. In the latter position, the bar is in the path of movement of the pusher 18.

The operation of the various air cylinders and motor of the bar feeder A may be controlled manually or automatically and in connection with limit switches similar to those described in U.S. Pat. No. 3,493,125. It is preferable to provide an automatic control system.

FIG. 12 is a schematic electrical diagram illustrating an electrical control system used with the feeder A. In general the graphic symbols and basic device designations therein are in accordance with the electrical standards of the Joint Industrial Council as set forth, for example, in the Apr. and May, 1967 issues of "Electro-Technology." The lines of the control circuit are numbered 1 through 26 at the left of FIG. 12 and are referred to by these numbers in the description which follows:

In the electrical system illustrated, there are nine solenoids identified as 1 SOL through 9 SOL. The first solenoid 1 SOL controls the supply of air to the pneumatic cylinder 17 and, when energized, causes turning of the escapement shaft 16 in a direction to advance the feed fingers 15 and to feed one bar from the plate 4 to the carriers 7. When this solenoid is deenergized, a spring causes said feed fingers to be retracted to the position shown in solid lines in FIG. 3.

The second solenoid 2 SOL control the supply of air to the pneumatic cylinders 57 and 58 and, when energized, causes both of them to operate to close the clamping jaws 55 and 56. A spring return causes retraction of the jaws when said solenoid is deenergized.

Four solenoids 3 SOL, 4 SOL, 5 SOL and 6 SOL are employed to control the supply of air to the air motor 6. The motor is operated to advance the conveyor only when the solenoid 3 is energized and is operated in the reverse direction to retract the conveyor only when the solenoid 5 is energized. Such motor effects high-speed movement of the conveyor when the solenoids 3 SOL and 4 SOL (or 5 SOL) is energized.

The solenoids 7 SOL and 9 SOL are provided on the screw machine B to control engagement and disengagement of a conventional clutch mechanism, not shown.

The solenoid 8 SOL controls the supply of air to the pneumatic cylinder 112 of the toggle-stop assembly T and when energized, causes the stop bar 117 to move from a position out of the path of movement of the pusher 18 to a position directly in said path as shown in solid lines in FIG. 9. A spring return causes the retraction of the stop bar to its original retracted position as soon as the solenoid 8 SOL is deenergized.

When it is desired to operate the feeder A, the three-position selector switch SS2 is moved to the "OFF" position and the three-position selector switch SS1 is moved from the "OFF" position to the "AUTO" position to close its contacts in line 2. If the pusher 18 is fully retracted at this time, the limit switch 1LS will be closed, and, upon closing of the SS1 contacts in line 2, the main control relay 1CR is energized and maintained energized by closing of its contacts in line 3. The closing of the latter contacts energizes the solenoid 1 SOL in line 3, thereby causing operation of the escapement cylinder 17 to advance the feed fingers 15 and feed the lowermost bar b of the stack to the carriers 7. The limit switch 2LS in line 5 is responsive to turning of the escapement shaft 16 and closes when the feed fingers 15 are moved to their advanced positions, thereby energizing the timer relay 2TR, which is maintained by closing of its contacts in line 6, and causing opening of the normally closed 2TR contacts in line 3 to deenergize solenoid 1 SOL.

After a suitable time delay (e.g., one-half to 2 seconds) adequate to allow movement of the one bar b onto the carriers, the normally open 2TR contacts close in line 9 to energize the solenoid 2 SOL in line 9, thereby causing operation of the air cylinders 57 and 58 to close the jaws 55 and 56 into gripping engagement with the bar b as shown in dot-dash lines in FIG. 7. Upon closing of said 2TR contacts in line 9, the timer relay 4TR is energized in line 10 and the normally open 4TR contacts close in line 12. After a suitable time delay (e.g., one-half to 2 seconds), the normally open 4TR contacts close in lines 11 and 13 to energize timer relay 5TR in line 13 and solenoids 3 SOL and 4 SOL in lines 11 and 12, thereby initiating high-speed forward movement of the conveyor by the air motor 6 to cause the feed fingers 122 to advance and grip the end of the bar *b*.

After a suitable time delay (e.g., one-half to 2 seconds), the normally closed 5TR contacts in line 12 open to deenergize the solenoid 4 SOL and slow down the conveyor, and the normally open 5TR contacts in line 14 close to energize the timer relay 6TR, thereby opening the normally closed 6TR contacts in line 9 to deenergize solenoid 2 SOL and release the clamping jaws. The solenoid 3 in line 11 remains energized and, upon retraction of the clamping jaws, the conveyor continues to feed the bar *b* toward the machine B at a reduced speed.

The relay 6TR provides a time delay (e.g., at least several seconds) sufficient to permit feeding of the bar *b* until it strikes a conventional stop (not shown) in machine B. Thereafter the normally open 6TR contacts in line 16 close to energize the timer relay 7TR and to close the normally open 7TR contacts in line 17 (before the normally closed 7TR contacts are opened), thereby energizing the solenoid 7 SOL to engage the clutch of machine B. The solenoid 3 SOL may remain energized so that the air motor 6 continues to apply a feeding pressure. After a time delay for engaging the clutch, the normally closed 7TR contacts open in line 17 to deenergize solenoid 7 SOL.

The bar *b* may be advanced in increments by the machine B in the conventional manner. When the pusher 18 approaches a forward position where there is only one more piece left to be machined, it trips and closes the limit switch 3LS in line 18 to energize the solenoid 9 SOL, thereby disengaging the clutch of the machine B at the same time it energizes the timer relay 8 TR in line 19 to open the normally closed 8TR contacts in line 2 (thereby deenergizing the main control relay 1CR) and to close the normally open 8TR contacts in line 19. As a result the normally open contacts of the control relay 1CR open in line 3 and the normally closed contacts of such relay close in line 8.

After a suitable time delay sufficient to enable the machine B to complete the machining of the last piece, the normally open 8TR contacts in line 20 close to energize the solenoid 8 SOL, which moves the toggle stop 117 to its advanced position shown in solid lines in FIG. 9, and to energize the solenoids 5 SOL and 6 SOL in lines 20 and 22, respectively, thereby reversing the air motor 6 and causing fast retraction of the pusher 18 and the remnant.

As the retracting pusher approaches the pneumatic toggle-stop assembly T, it trips and opens the limit switch 7LS in line 22 to deenergize solenoid 6 SOL and slow down the speed of the air motor. The air motor 6 then continues to retract the pusher at a slower speed, and, just before it engages the toggle stop 117, the pusher trips and closes the limit switch 8LS in line 25 to energize the time relay 9TR, which is maintained by closing of its contacts in line 26, and to close the normally open 9TR contacts in line 8. This results in energizing the solenoid 2 SOL in line 9 to close the clamping jaws 55 and 56 into gripping engagement with the remnant. After a suitable time delay (e.g., one-half to 2 seconds) sufficient to permit gripping of the stationary bar remnant, the normally closed 9TR contacts in line 24 open to deenergize the solenoid 8 SOL and allow spring retraction of the stop bar 117 out of the path of movement of the pusher 18. At the same time, the normally open 9TR contacts in line 23 close to energize solenoid 6 in line 22 and cause high-speed retraction of the pusher, thereby facilitating separation of the feed fingers 122 from the remnant then being gripped by the clamping jaws 55 and 56. The pusher moves a few inches from the toggle stop 117 to the rear stop 132 and, during this movement, trips and closes the limit switch 1LS in line 2 to start another cycle.

The cycles are repeated automatically so long as there is a supply of bars *b*. When the supply is exhausted or when there is no bar or remnant to be gripped by the jaws 55 and 56, such jaws move beyond the axis of the pusher 18 and into or substantially into engagement and the screw 127 engages the button 131 to close the switch 6LS in line 7 and energize the special control relay 3CR, which is maintained by closing of its contacts in line 5. This opens the normally closed 3CR contacts in lines 10 and 20 and prevents operation of the conveyor when no bar or remnant is present.

The bar feeder A may be stopped at any time by moving the selector switch SS1 to the "OFF" position. To resume operation, the switch is returned to the "AUTO" position to close its contacts in line 2 and the restart button 150 is depressed momentarily to close its contacts in lines 1 and 4, thereby energizing the timer relay 2TR in line 5 and the control relay 11CR in line 1 while closing the normally open 11CR contacts in lines 11, 12 and 15 and opening the normally closed 11CR contacts in lines 9, 10 and 21. At the same time, the normally open 11CR contacts between lines 1 and 2 close, the main control relay 1CR is energized, and the normally open 1CR contacts close in line 3 to maintain relays 1CR and 11CR until the normally closed 8TR contacts in line 2 are opened.

Opening of the normally closed 11CR contacts in lines 9 and 10 at the time the restart button is depressed prevents operation of the clamping jaws 55 and 56 while the bar *b* is still being fed to the machine B.

The selector switch SS2 permits manual control of the conveyor when the selector switch SS1 is in the "MAN." position.

The electrical system shown in FIG. 12 may obviously be changed or simplified to reduce cost of manufacture, and it will be apparent that the process of this invention may be performed in various ways by different equipment. If it is desired to perform more of the steps of the process manually, the limit switches may obviously be associated with lamps, horns, or other indicators to signal the operator when a switch is to be thrown or a motor of pneumatic cylinder is to be operated or stopped, and each of the solenoids 1 SOL through 8 SOL may be provided with separate manual controls, if desired. The electrical system of FIG. 12 is submitted for purpose of illustration rather than limitation.

The provision of clamping jaws, such as the jaws 55 and 56 according to the present invention makes it possible to handle bars of small diameter even when the carriers (7) are widely spaced on the conveyor chain 5. Such carriers may be spaced from each other a distance of 8 to 24 inches or more so that a relatively small number (e.g., 4 to 8) of carriers can handle bars with lengths of 10 to 20 feet or so.

The clamping jaws (55, 56) also make it possible to locate the bar (*b*) accurately relative to the conveyor chain so that feeding of the bar can be controlled accurately. They also ensure proper seating of the bar relative to the feed fingers and proper gripping of the bar by said fingers.

It will be understood that the above description is by way of illustration rather than limitation and that, in accordance with the provisions of the patent laws, variations and modifications of the specific methods and devices disclosed herein may be made without departing from the spirit of the invention.

Having described my invention, I claim:

1. A bar feeder for feeding bars or tubes comprising a conveyor (5) having mounted thereon a series of bar-receiving carrier (7) and a pusher (18) with feed fingers (122) for gripping the rear end of a bar (b) on said carriers, a feed rack (13, 14) for supporting a plurality of bars, escapement means (C) for feeding one bar at a time laterally from said feed rack to said carriers, clamping jaws (55, 56) for engaging the opposite sides of a bar on said carriers to support the bar and hold it against axial movement while the conveyor is advanced, and motor means (57, 58) for moving said clamping jaws laterally between an advanced gripping position in engagement with a bar and a retracted position out of the path of movement of said pusher.

2. A bar feeder as defined in claim 1 wherein said clamping jaws (55, 56) have means (142) for lifting the rear end portion of a bent bar as the jaws are moved against the bar to straighten the bar.

3. A bar feeder as defined in claim 1 wherein one of the clamping jaws has a generally V-shaped portion (142) for engaging a bar to hold it in a position coaxial with the pusher.

4. A bar feeder as defined in claim 1 wherein said carriers (7) are spaced at least 8 inches apart and said clamping jaw (55, 56) provide the sole means for preventing axial movement of the bar on the carriers while the pusher (18) is moved against the end of the bar.

5. A bar feeder as defined in claim 1 wherein means (2TR, 2SOL) are provided for automatically advancing the clamping jaws (55, 56) against the opposite sides of a bar after said bar is fed from the feedrack to said carriers, means (4TR, 3SOL) are provided for automatically advancing the conveyor after the bar is gripped by said jaws to force the feed fingers over the rear end of the bar, and means (6TR) are provided for thereafter automatically releasing the clamping jaws and causing them to be retracted out of the path of movement of the pusher.

6. A bar feeder as defined in claim 1 wherein a stop (101) is provided to limit the movement of one of the clamping jaws, and means (94, 102) are provided for adjusting the position of said stop in accordance with the size of the bars being fed to the conveyor.

7. The bar feeder as defined in claim 1 wherein a retractable stop (117) is provided to limit the rearward movement of the pusher (18) and to stop retraction of the bar remnant after the rear of the bar arrives at a position rearwardly of the clamping jaws (55, 56), means (8LS, 9TR) are provided for automatically advancing the clamping jaws against the bar after it arrives at said last-named position, and means (4TR, 3SOL, 4SOL) are provided for releasing the feed fingers while the bar remnant is gripped by said jaws.

8. A bar feeder as defined in claim 7 wherein means (9TR) are provided for automatically retracting said stop out of the path of movement of said pusher before said feed fingers are released from the remnant.

9. A bar feeder as defined in claim 8 wherein means (9TR, 6SOL) are provided for automatically increasing the rearward force on the pusher (18) when said stop (117) is retracted and while the bar remnant is held by said jaws against axial movement to cause high-speed retraction of the pusher and to pull the feed fingers (122) off the remnant.

10. A bar feeder as defined in claim 9 wherein means (5SOL, 6SOL) are provided for retracting the pusher at a relatively high speed and means (7LS) are provided for automatically slowing down the retraction of the pusher before it arrives at said last-named position.

11. In a process for feeding long bars (b) in which an escapement mechanism (C) is provided for feeding such bars one at a time from a storage rack (13, 14) to a conveyor (5) having a pusher (18) with feed fingers (122) for gripping the rear end portion of a bar supported on said conveyor, the improvement which comprises gripping and supporting the rear portion of a bar after it is moved onto the conveyor (5) and holding said rear portion in axial alignment with said pusher (18) while advancing the pusher relative to the bar to force said feed fingers (122) over the rear end of the bar, thereafter discontinuing such gripping, and advancing the pusher to feed the bar axially while it is gripped by said feed fingers.

12. A process as defined in claim 11 wherein a lifting force is applied to said rear portion to straighten the bar before it is gripped by said feed fingers.

13. A process as defined in claim 11 wherein the feed fingers are forced over the rear end of the bar by advancing the pusher (18) at a relatively high speed, and thereafter the bar is advanced by the pusher at a slower speed.

14. A process as defined in claim 11 wherein the bar is advanced by the pusher in a forward direction and thereafter retracted in the opposite direction by said feed fingers, the movement of the bar is stopped at a predetermined position before the pusher is fully retracted, the rear end portion of the bar is gripped on its opposite sides and held against axial movement while the pusher is moved rearwardly to its fully retracted position, and said rear end portion is thereafter released and removed.

15. A process as defined in claim 14 wherein said rear end portion of the bar is gripped and held against axial movement out of said predetermined position while said feed fingers are pulled off the bar by retracting the pusher.

16. A process as defined in claim 15 wherein the pusher is retracted at a relatively high speed until the bar approaches said predetermined position, the speed of retraction is reduced before the bar reaches said last-named position, and the retracting force is increased to pull the feed fingers off the bar after the rear end portion of bar has been gripped.

17. A bar feeder having a conveyor (5), a feedrack at one side of the conveyor including a plate (13) and guide means (14) for holding a stack of bars (b) against said plate, a stop member (4) for engaging the lowermost bar in said stack, said guide means being spaced from said stop member to permit one bar only to move between said stop member and said guide means, at least one escapement finger (15) having a bar-engaging portion (49) with a thickness less than the diameter of each bar mounted to reciprocate in the space between said stop member and said guide means, an escapement shaft 16 having a pin (45) with a head portion (47) pivotally connected to said escapement finger to hold said finger against said stop member means (84) mounting said shaft for turning, and motor means (17) for turning said shaft (16) in the opposite direction to advance said finger (15) and feed one bar (b) between said stop member (4) and said guide means (14) and to return said finger to a normal retracted position so that the next bar in said stack moves against said stop member.

18. A bar feeder as defined in claim 17 wherein said stop member (4) is a flat plate, said escapement shaft (16) is parallel to and adjacent said plate, and said pin (45) has a rounded head portion (47) which fits in a recess (48) in said escapement finger.

19. A bar feeder as defined in claim 18 wherein a narrow slot (15a) is provided between said stop member (4) and said first-named plate (13) to receive said bar-engaging portion (49) of the escapement finger.

20. A bar feeder as defined in claim 19 wherein each escapement finger has bar-engaging portions (49, 50) at its opposite ends, one of said portions (49) having a thickness greater than the other (50), each of said portions being of a size to fit in said narrow slot (15a).

21. A bar feeder as defined in claim 17 wherein said conveyor comprises a chain (5) mounted on a box beam 1, said stop member comprises a long inclined plate (4) extending longitudinally in the direction of said beam, and said first-named plate (13) comprises an inclined plate transverse to said stop member (4) for holding the bars in said stack parallel to said box beam, a series of vertical plates (20) rigidly mounted on one side of said beam for rigidly supporting said stop member, and a series of vertical plates (9) rigidly mounted on the opposite side of said beam and having means (42) extending above the box beam for supporting said first-named plate (13) above and adjacent to said stop member.

22. A bar feeder as defined in claim 21 wherein a capping assembly (D) is mounted on said vertical plates (9) and has a capping bar (8) mounted to move upwardly and downwardly toward and away from said conveyor (5).

* * * * *